Patented Dec. 20, 1949

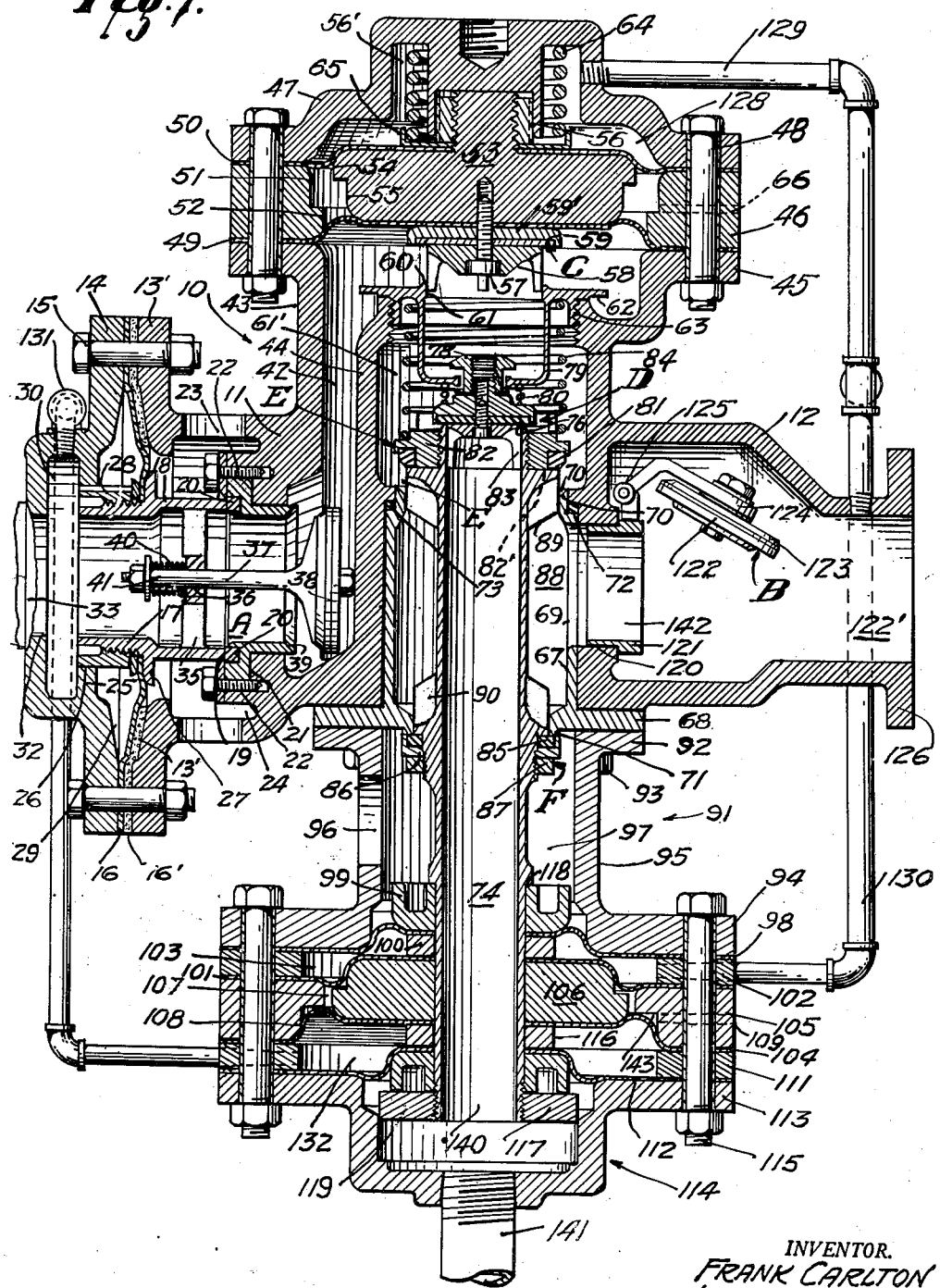

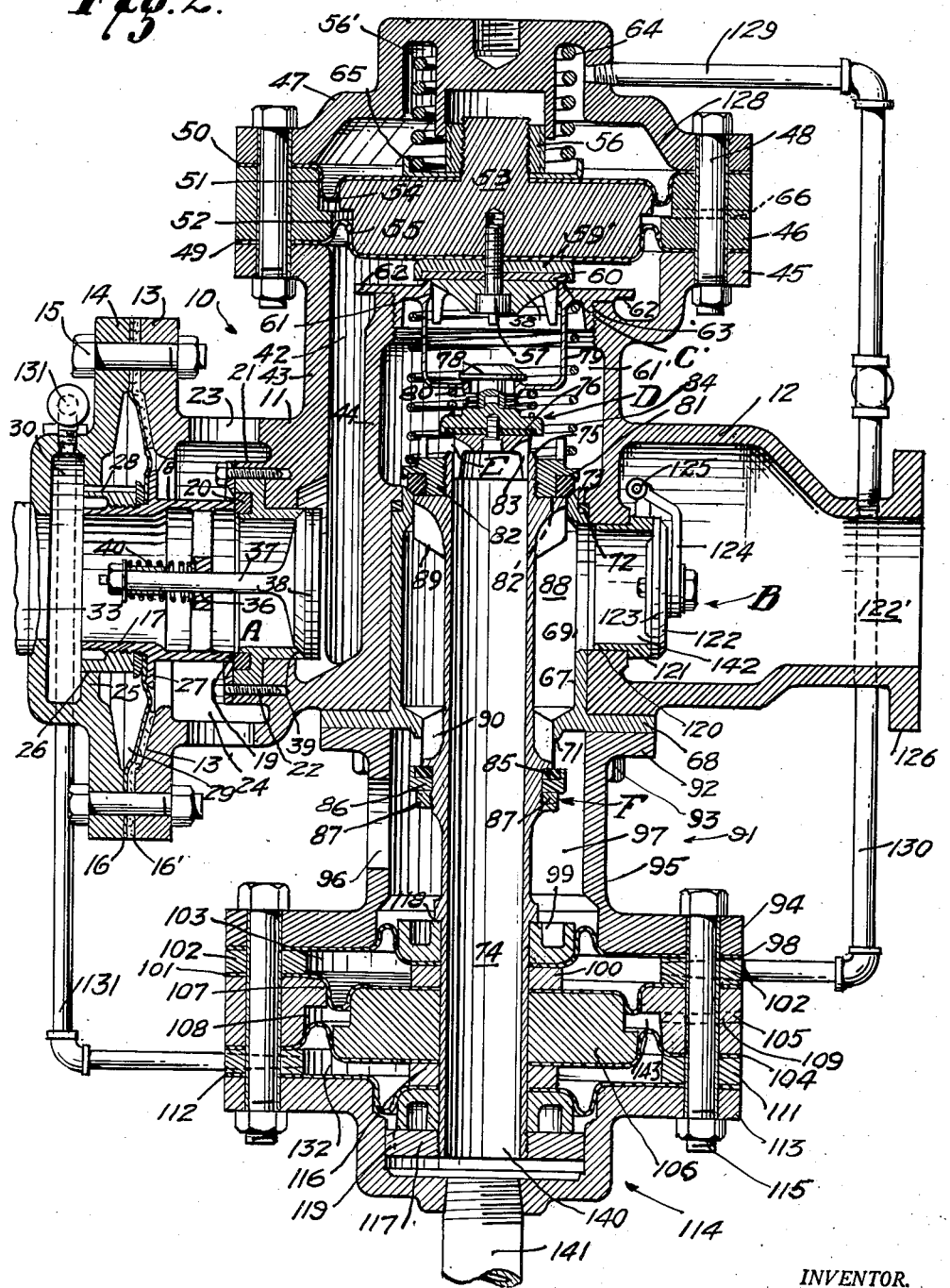

2,491,604

UNITED STATES PATENT OFFICE 2,491,604

BACK SIPHONAGE PREVENTION, ANTIBACK-FLOW, AND VACUUM BREAKING VALVE

Frank Carlton, Los Angeles, and Leonard L. Snyder, Montebello, Calif.

Application June 22, 1943, Serial No. 491,842

8 Claims. (Cl. 137—144)

This invention relates to a back siphonage prevention, anti-backflow, and vacuum breaking valve.

In connection with liquid flow systems such, for example, as those in which water is delivered from a water main through a connecting service line to the domestic lines of a building, or in cases where water is delivered in the same manner to equipment in an industrial plant or to any private or domestic piping system, or fixtures or equipment therefrom, occasions sometimes arise when the water pressure in the service line and the water pressure in the domestic piping system become unbalanced, so that a major pressure occurs in the domestic piping system. Under such conditions a backflow action will be created, causing this water, now considered used as well as polluted, contaminated, or containing deleterious material, to flow reversely through the domestic piping system, the service line, and into the water mains, and thus contaminate the pure water supply. Heretofore, various structures have been produced in an attempt to prevent the backflow or back-siphonage of water from the domestic lines to the service line or water main, or to interrupt or prevent back-siphonage from water served fixtures, devices, containers, receptacles or equipment into the domestic piping system, or to interrupt and make impossible backflow communication between dual interconnected supply systems at points of cross-connection where said systems contain water from different sources, or where one supply system, often called the secondary, is not under proper sanitary supervision. Various structures, because of leaking barriers, have failed to operate and have allowed backflow to occur at or through the structure or device without detection. This might be brought about by the failure of valves to seat or by the fact that certain parts might become damaged or barrier walls ruptured within the valve structure itself.

It is the principal object of the present invention, therefore, to provide automatic means which will act to prevent, with absolute certainty, backflow or back-siphonage of water from the domestic lines to the service lines or between water served fixtures, devices, containers, receptacles or equipment, and the domestic piping system, or between interconnecting supply systems of different origin, or between any parts or areas of either supply or domestic lines as may be desired.

It is an object of this invention to provide a device for the prevention of backflow or back-siphonage which incorporates barrier means so positioned as to give a visional indication of failure or rupture on the outside of the device.

The present invention contemplates a positive means to prevent backflow or back siphonage, the device including the following new and novel elements, acting in combination, and arranged in a flow system from the service line to the domestic piping:

1. A vacuum breaker,
2. A poppet-type check valve.
3. A main valve of the differential regulator type,
4. A barrier check valve, whose operation is more fully described later,
5. A differential relief valve,
6. A check valve which may be a swing type, or any other desired type of valve.

The function and mode of operation of each of these parts, both independently and in combination, will be more fully described in the following specification.

The invention is illustrated by way of example in the accompanying drawings in which:

Figure 1 is a view in central vertical section showing the complete valve structure with its parts in the relationship they assume under normal flow conditions.

Fig. 2 is a view similar to Fig. 1 showing the structure with the various valve elements in the position they assume when a condition of backflow or back siphonage exists.

The following preliminary discussion is made in order to explain more clearly the operation of this invention in a general way. Interpretation of various terms and operating conditions are arbitrarily defined as follows:

A. *Service line.*—Piping connecting the water main and the intake of the backflow prevention device.

B. *Domestic line.*—All piping attached to and beyond the discharge side of the backflow prevention device.

C. *Backflow condition.*—A backflow condition exists when the ratio of the domestic pressure to the service pressure exceeds a predetermined amount. It is understood that circumstances may dictate that this ratio may be changed, and may be expressed as follows:

$$\frac{1-x}{1}$$

or $$\frac{1}{1}$$

or $$\frac{1+x}{1}$$

in which $x$ may be assigned any desired value.

The ratio of $$\frac{1-x}{1}$$

indicates that the backflow condition is considered to exist when the domestic pressure is below the service line pressure.

The ratio $$\frac{1}{1}$$

indicates that the backflow condition is considered to exist when the domestic pressure and the service line pressure are equal.

The ratio of $$\frac{1+x}{1}$$

indicates that the backflow condition is considered to exist when the domestic pressure is above the service line pressure.

It will be evident that the ratio of $$\frac{1-x}{1}$$

insures a greater factor of safety in the operation of the present invention, and this disclosure has here been made by way of example only.

There are two general cases where a backflow condition exists. The first case is where the system is under pressure and the ratio of the domestic pressure to the service line pressure equals or exceeds the ratio as defined above.

The first case is the more common and will be considered first. For protection against backflow in this case the invention includes a new safety feature in the form of a main pressure differential regulator valve. This main valve is responsive to domestic line pressure on one side and to opposing service line pressure on the opposite side. However, the effective area exposed to domestic pressure is larger than the area exposed to service pressure, with the result that this main valve automatically closes and shuts off normal flow when the pressure in the domestic piping rises to a predetermined amount below the service pressure. In other words, this main valve automatically maintains, during normal flow or shut-off condition, a predetermined differential in pressure between the service and the domestic line, the lower pressure always being on the domestic side.

On the discharge side of the main valve is a differential relief valve, which operates under a backflow condition to discharge water and to relieve the pressure in a section of passageway within the device. This relief valve is responsive to service line pressure on one side and to an opposing combination of domestic and passageway pressures on the opposite side. Under normal flow, or when normal flow ceases, this relief valve remains in the closed position. However, the effective areas of the relief valve structure exposed to the opposing pressures are so proportioned that if the service pressure falls, or the domestic pressure rises, until a backflow condition is approached, the relief valve opens sufficiently to reduce the pressure in the above mentioned passageway. If the domestic pressure continues to rise, the passageway pressure continues to fall, and will finally reach zero when the domestic pressure is a predetermined amount above the service line pressure. The pressure in this passageway is always less than the service line pressure. Since any water backflowing from the domestic line must pass through this passageway, it is obvious that this backflow cannot possibly return into the service line, since it is impossible for a fluid to flow from a region of lower pressure to a region of higher pressure.

A check valve, previously mentioned as part six, is placed on the domestic side of the backflow prevention device. It may be placed in the domestic piping adjacent to the device, or it may be incorporated in the device itself. Under a backflow condition, this check prevents the drainage of water from the domestic system through the relief valve port, and also makes it possible to reduce the pressure in the above mentioned passageway to atmospheric, whenever the domestic pressure exceeds the service line pressure by a predetermined amount.

The second case will now be considered, which occurs when the pressure in the service line is atmospheric, or when a vacuum condition exists. Occasionally, due to breaks in the water main or to exceptionally heavy demands, as, for example, might occur when fire pumps are used, a partial vacuum develops in the water main and in the service line leading to the domestic piping system. It has long been recognized that a vacuum always increases the difficulties of back-siphonage or backflow control or prevention. In some devices when water is flowing reversely past leaking checks or other movable barriers, (see Miller Patent No. 1,105,991), an attempt is made to discharge this reverse flow to atmosphere through a discharge port. A vacuum condition, however, occurring at the same time can draw air in through this same discharge port and prevent free escape of the reversely flowing water, and consequently, water is frequently drawn back into the service pipe and water main either in the form of spray or as a liquid. The backflow prevention device, therefore, includes a primary vacuum breaker located on the service line side. This vacuum breaker supplies air to the service pipe at a point adjacent to the backflow device and in order to reduce the vacuum as much as possible, it is constructed with an air intake equal to or greater than the area of the service pipe. It is recognized that the inherent weakness of all vacuum breakers lies in their tendency to freeze or stick when held in a closed position for long periods of time. In many instances the common type of vacuum breaker will fail to operate due to the fact that the area exposed to atmospheric pressure is approximately equal to the seat area, and hence sufficient force is not available to cause the vacuum breaker to open especially under low vacuums. The primary vacuum breaker in this invention is designed so that a large surface area is exposed to atmospheric pressure, thereby making certain that even under low vacuums, sufficient force will be available to open the vacuum breaker and admit air to the service line.

However, under high vacuum conditions the primary vacuum breaker may not entirely destroy the vacuum in the service line, and in conjunction with leaking checks, this vacuum may extend on a greatly reduced scale to the interior of the device itself. To overcome this difficulty, the present invention is so constructed that whenever the pressure in the service line approaches zero or when a partial vacuum is created therein, or whenever a backflow condition exists, a barrier check is moved into position, creating within said device an air chamber which is connected to the atmosphere, and consequently, is under atmospheric pressure. The barrier check moves in unison with the previously mentioned differential relief valve and the air chamber thus formed is entirely independent of the passageway that is vented to atmosphere through the openings of the relief valve port. This, then, gives a novel result. If the first barrier check in the domestic line is leaking, the water is collected in the passageway and discharged to atmosphere. If, at the same time, the partial vacuum in the service pipe extends through leaking checks to the interior of the structure, the air chamber formed by the movement of the barrier check, being connected to the atmosphere, can supply air to this residual vacuum and reduce it to such an extent that it cannot draw water into the service pipe. Thus, we see that reverse flow leakage past the check in the domestic piping can be freely discharged through a port that does not supply air to break a vacuum. At the same time, air can be supplied through a separate port to break a residual vacuum, thereby preventing commingling of incoming air, and polluted water that is being discharged.

The poppet type check valve is located between the primary vacuum breaker and the main differential regulator valve. It has two functions: (1) It prevents water in the intake chamber of the backflow prevention device from draining back into the service line when a vacuum condition exists; (2) it prevents or at least reduces the residual vacuum that might otherwise extend to the main valve.

The foregoing example covers a common case where water is delivered from a main to a consumer, but it is to be understood that a similar condition might arise within the consumer's domestic piping itself, whereby water from a polluted section, fixture, device, container, receptacle, or equipment, might flow reversely and thereby pollute another section where pure water supply is to be maintained.

Referring more particularly to the drawings, 10 indicates a main valve housing, formed at one side with a cylindrical induction connection 11 and, at the diametrically opposite side with a cylindrical eduction connection 12. The induction connection 11 houses a structure generally indicated at A and designated as a primary vacuum breaker assembly. The eduction connection 12 is provided to house a final check valve designated at B. Within the upper end of the housing 10 is a main differential valve structure generally indicated at C and beneath which an air intake valve structure is disposed, generally indicated at D. A barrier check valve is disposed within the housing and indicated at E, and a relief valve is associated therewith indicated generally at F.

The induction housing 11 is formed with an enlarged bolting flange 13 at its outer end against which a cap 14 is secured by bolts 15. Disposed between the contiguous marginal faces of the bolting flange 13 and the cap 14 is a vacuum breaker diaphragm 16, the purpose of which will be hereinafter described. The diaphragm 16 is mounted around a tubular cylindrical extension 17 of a cylindrical vacuum breaker valve 18. A pad 16' of soft porous material, such as felt, is placed between diaphragm 16 and bolting flange 13, thereby preventing adhesion of the diaphragm to the surface 13', and at the same time permits air to contact the outside surface when a vacuum occurs in the service line. The vacuum breaker valve extends inwardly and has a sealing face 19 bearing against the face of a valve ring 20. The valve ring 20 is mounted in an annular cage 21 secured by cap screws 22 within the cylindrical induction extension of the main valve housing 10. The portion of the induction member 11 occurring between the main valve housing and the bolting flange 13 is formed with a plurality of vent ports 23, which establish communication between the atmosphere and an annular chamber 24 circumscribing the valve 18. The cap 14 is provided with an annular web 25 having a central bore 26 through which the extension 17 of the valve 18 extends.

The central portion of the diaphragm 16 is secured in fluid-tight relation to a flange 27 on the vacuum valve 18 by a washer and nut 28 threaded onto the extension 17. The space occurring between the diaphragm 16 and the annular portion 25 of the cap 14 forms a chamber 29. This chamber is in communication with an annular passageway 30 formed in the outer extension of the cap. The bore 32 of the cap receives a service pipe 33. Thus, water from the water main is delivered through the service pipe 33 into the induction side 11 of the main valve housing 10. The fluid pressure exerted against the diaphragm 16 by the liquid accumulated within the chamber 29 tends normally to flex the diaphragm and hold the end face of the vacuum breaker valve 18 against the presented face of the valve ring 20.

The vacuum breaker valve 18 is formed with a central web 35 having a central bore 36 therethrough. A valve stem 37 reciprocates through this bore. Its inner end carries a tappet type of valve 38 which may seat against a valve seat 39 as drawn by an expansion spring 40. The spring 40 is disposed around the valve stem and interposed between the web 35 and a nut 41 on the outer end of the valve stem. It will be seen that the valve 38 may move in unison with the vacuum breaker valve 18, and that it may also move independently of the vacuum breaker valve 18 when the valve 18 is seated.

The central bore of the valve cage 21 communicates with a chamber 42 formed within the main valve housing 10. The chamber 42 is defined between the outer wall 43 of the housing 10 and an annular wall 44 within the housing and establishes communication between the bore of valve cage 21 and the passageway through main valve C. The upper end of the wall 43 carries a bolting flange 45 upon which a diaphragm spacer ring 46 is disposed. Mounted above the spacer ring is a top cover plate 47. The top cover and the spacer ring are secured to the bolting flange 45 by cap screws 48. Interposed between the face of the bolting flange 45 and the lower face of the ring 46 is a diaphragm 49. Interposed between the upper face of the ring 46 and the cover plate 47 is a diaphragm 50. The diaphragms 49 and 50 are thus spaced from each other. Attention is directed to the fact that the inner circumference of the ring 46 is formed with an upper portion 51 of relatively large diameter as compared with the lower portion 52. An inside spacing member 53 is disposed between the central portions of the diaphragms 49 and 50 and has an upper portion of relatively large diameter, as indicated at 54, and a lower portion of small diameter, as indicated at 55. These diameters are considerably less than the circumscribing diameters of the spacing ring 46 and make it possible for the diaphragms 49 and 50 to be each formed with an annular corrugation which will tend to maintain a constant effective diaphragm area as the inside spacer 53 moves the main valve C to and from closed position. On the underside of spacer 53 is mounted a main valve disc 59. It is carried by disc retainer 59′, which also clamps diaphragm 49 firmly to the underside of spacer 53. Valve disc 59 is clamped to the disc retainer by main valve guide 58, which is held by cap screw 57 threaded into spacer 53. Guide 58 reciprocates in bore 61 and guides disc 59 into proper alignment as it bears against seat 60 in closed position. Valve seat 60 is carried by plate 62, which has a downwardly extending threaded portion 63 engaging the threaded bore formed by the inner housing wall 44. Diaphragm 50 is firmly clamped to the upper side of spacer 53 by washer 65 and a nut 56, which is threaded onto a hub that extends upwardly from spacer 53. As the main valve moves to and from closed position, nut 56 is guided in bore 56′, thereby insuring alignment of spacer 53. The main differential valve disc 59 is urged away from its seat by fluid pressure acting against the diaphragm 49, and at the same time is urged toward its seat by the combined action of fluid pressure against diaphragm 50, and the force of spring 64, which bears against washer 65. Vent openings 66 occur between the diaphragms 49 and 50, and thus any fluid which might leak through a faulty diaphragm will drain out through these openings and will indicate the leakage.

Mounted within the cylindrical portion 44 of the valve housing is a valve seat sleeve 67 provided with a flange 68 at its lower end and having a central bore 69. An upwardly presented valve seat 70 is formed at the upper end of the sleeve as part of the barrier check valve E. A lower valve seat 71 is formed at the lower end of the sleeve 67 and is downwardly presented to form part of the differential relief valve structure F. A packing ring 72 is interposed between a shoulder 73 in the housing portion 44 and a shoulder upon the sleeve 67 to form a seal at the upper end of the sleeve. Inside housing 44 and sleeve 67 is an air intake tube 74, which is free to reciprocate in response to pressures exerted against diaphragms 101 and 104. At the upper end of tube 74 is an air intake valve seat 75 (Fig. 2). As tube 74 is moved upwardly in preparation for normal flow of water, seat 75 comes into contact with air intake valve disc 76 (Fig. 2), slightly before it reaches its extreme upward position. The disc 76 is urged toward its seat by the action of spring 80. The air intake valve is of the poppet type and is formed with an enlarged head portion 78 which engages with arms 79 that extend from the underside of plate 62. These arms limit the downward movement of the air intake valve, and therefore opens the valve before tube 74 reaches its extreme downward position. Disc 76 is clamped in place with valve guide 83, which also insures proper alignment between seat 75 and disc 76 in closed position.

Carried at the upper end of the tube 74 is the barrier check valve E. This comprises a valve ring 81 which is clamped tightly between clamping nut 82 and shoulder 82′ on tube 74. As tube 74 moves to its extreme upward position, water may flow freely from chamber 61′ past seat 70 and into passageway 88. As tube 74 moves downwardly, valve ring 81 comes into contact with seat 70, preventing further downward travel of tube 74 and at the same time cuts off communication between chamber 61′ and passageway 88. The barrier check valve is urged toward its seat by spring 84. Also mounted on tube 74 at a point below valve seat 71 is a different relief valve generally designated by the letter F. It is comprised of a valve ring 85 tightly clamped between a shoulder on tube 74 and a retainer 86 and locked in place by a nut 87. As tube 74 moves upwardly, valve ring 85 comes into contact with seat 71, preventing further upward travel of tube 74, and at the same time makes a seal preventing the escape of water from passageway 88 past seat 71. As tube 74 moves to its extreme downward position, valve ring 85 is removed from seat 71 a sufficient amount to allow water to escape freely from passageway 88 into chamber 97. Radial guide fins 89 and 90 are formed on the outer face of tube 74 to guide the tube centrally as it moves up and down through sleeve 67, and between which fins water may pass.

Extending downwardly beneath the bolting flange 68 of the valve sleeve 67 is a differential relief valve housing 91. This housing has an upper flange 92 secured to the main housing 10 by cap screws 93. A lower bolting flange 94 is formed at the lower end of this section to carry a diaphragm housing assembly which will be hereinafter described. Intermediate the bolting flanges 92 and 94 is a cylindrical wall 95 having a fluid relief opening 96 formed through it. A chamber 97 thus occurs within the cylindrical housing portion 95. This chamber is in communication with the atmosphere at all times.

The lower end of the chamber 97 is closed by a diaphragm 98 which is secured by spacers 99 and 100 upon the air intake tube 74. Disposed beneath the member 100 is a diaphragm 101, which is spaced from the diaphragm 98 at its outer edge by a spacing ring 102. Thus, a chamber 103 occurs between the diaphragms 98 and 101. Disposed beneath the diaphragm 101 and spaced therefrom is a diaphragm 104. The marginal edge of the diaphragms 101 and 104 are spaced from each other by a ring 105. The central portions of the diaphragms 101 and 104 are held in spaced relation to each other by an inside spacer 106. The ring 105 is formed with an upper central bore 107 and a lower central bore 108. The upper bore is of smaller diameter than the lower bore and thus insures that the pressure area of diaphragm 101 will be smaller than that of diaphragm 104. The space between the diaphragms 101 and 104 communicates with the atmosphere through ducts 109.

Disposed beneath the diaphragm 104 and at the outer margin thereof is a spacing ring 111. This is interposed between the diaphragm 104 and a diaphragm 112. The diaphragm 112 is secured at its marginal edge by a bolting flange 113 of a lower cap 114. The cap and the rings 102, 105 and 111 are held in assembled position with relation to the flange 94 of the housing section 91 by bolts 115. The air intake tube 74 extends downwardly through all of these diaphragms and is fixed with relation to each one of them. A spacing collar 116 is provided between the diaphragms 104 and 112, and a threaded nut 117 is provided at the end of the air intake tube 74 to hold all of the diaphragms and their spacing collars rigidly against a shoulder 118 formed on the body of the tube 74. The nut 117 fits within a bore 119 formed in the cap 114 and thus guides the air intake tube in its reciprocating movement.

Formed through the wall of the main housing 10 and in communication with the eduction connection 12 is a passageway 120 which leads to a valve tube 121. The valve tube 121 thus communicates with the passageway 88 occurring around the relief tube 74. Mounted at the outer end of the valve tube 121 is a final check valve generally indicated at B, and which is here shown as comprising a circular valve disc 122 carried by a mounting plate 123. The plate 123 is mounted upon an arm 124 which is pivoted at 125 and thus the check valve operates by gravity to swing to its closed position when pressure of fluid against its inner face is not sufficient to lift it. At the outer end of the eduction connection 12 is a coupling flange 126. This flange receives the domestic pipe.

The top cover plate 47 is formed with a chamber 128 which occurs above the upper diaphragm 50. A pressure tube 129 communicates with this chamber and leads downwardly to the eduction connection 12, where it receives fluid occurring within the chamber 122'. Attention is called to the fact that tubes 129 and 130 are in communication with the fluid pressure on the discharge side of check valve B. Thus, when an extreme backflow condition exists it is possible to fully open relief valve F, thereby causing the opening of chambers 88 and 61' to atmospheric pressure. A connection is provided in the line of the tube 129 to attach a tube 130. The tube 130 leads to the spacing ring 102 and delivers liquid to the space occurring between the diaphragms 98 and 101.

As previously described, the cap 14 of the vacuum breaker structure is formed with an annular passageway 30. This passageway receives fluid from the service line 33. A tube 131 is in communication with the passageway 30 and leads to an opening in the spacing ring 111, which forms a part of the differential relief valve. This opening communicates with a chamber 132, which occurs between the diaphragms 104 and 112.

Water from service line 33 enters vacuum breaker cap 14, filling chambers 30 and 29, causing vacuum breaker diaphragm 16 to move, thereby closing vacuum breaker seat at 19. Water then flows through piping 131 into chamber 132, which is closed on the lower side by sealing diaphragm 112. Pressure in chamber 132 exerts an upward force on diaphragm 104 causing air intake tube 74 to move upwardly until bleeder valve disc 85 is closed against seat 71. At the same time barrier check valve ring 81 is raised off seat 70 in preparation for normal flow of water. As air intake tube 74 moves upwardly and before relief valve disc 85 reaches seat 71 air intake valve 76 contacts seat 75, thereby preventing escape of water through inside of air intake tube 74 to atmosphere. Air intake valve 76 is urged toward its seat by spring 80. Pressure then moves spring loaded check valve 38 off of seat 39 and water enters chamber 42. Pressure in chamber 42 exerts an upward force on diaphragm 49 lifting the main regulator shut-off valve C from its seat and permits water to flow into chamber 61', past seat 70 into chamber 88, through passageway 120, past swing check B and into the domestic piping.

As pressure in the domestic piping rises, this pressure is transmitted through piping 129 to chamber 128 and exerts a downward force on diaphragm 50. The downward force on diaphragm 50 is opposed by the upward force on diaphragm 49, but since the area of diaphragm 50 is larger than diaphragm 49 main valve C will close while the pressure in the domestic piping (also chamber 128) is a predetermined amount below the pressure in service line 33.

Spring 64 assists in closing of main valve C and also insures sufficient pressure in chamber 132 to close relief valve F before flow starts past main valve seat 60. The pressure in the domestic piping is also transmitted through piping 130 to chamber 103 and exerts a downward force on diaphragm 101, which is opposed by the upward force on diaphragm 104. Since the pressure in chamber 103 is less than the pressure in chamber 132, due to the action of the main regulator shut-off valve C, relief valve F is not pulled out of seat under normal flow or when normal flow ceases. If the pressure in the service line 33 drops, or the pressure in the domestic piping rises until a backflow condition is approached, the main valve C is simply pressed more firmly against its seat. At the same time, however, the pressure in the domestic line is transmitted through piping 130 to chamber 103, always with the result that before a backflow condition exists the relief valve structure at F along with air intake tube 74 moves downwardly sufficiently to reduce the pressure in passageway 88, and will thus automatically maintain the pressure in passageway 88 below the pressure in service line 33. If the domestic pressure continues to rise, the pressure in passageway 88 continues to fall due to the downward movement of relief valve F, along with air intake tube 74. When the pressure in the domestic line is a predetermined amount above the pressure in service line 33, tube 74 will have moved to its extreme downward position, and the pressure in passageway 88 will be zero, since it is opened to the atmosphere through the relief port, through chamber 97 and through the opening 96. At the same time, because of the closure of barrier check disc 81 against seat 70, chamber 61' is no longer in communication with passageway 88.

It should here be noted that under the action of spring 84 the air intake tube 74 will always be in its extreme downward position whenever the pressure in service line 33 drops to a point slightly above atmospheric or is below atmospheric. This is true regardless of the pressure in the domestic line.

As air intake tube 74 moves downwardly poppet valve 76 is parted from its seat 75 by arm 79, opening chamber 61' to the atmosphere through passageway 140 and port 141. If swing check 122 is holding, no water is drained from the domestic piping. If swing check 122 does leak, water flows through passageway 142 into passageway 88, past relief valve seat 71 into chamber 97 and is discharged through port 96 to atmosphere.

The vacuum breaker valve 19 remains in the closed position as long as there is any pressure in the service line at 33. If a vacuum occurs in the service line, atmospheric pressure against diaphragm 16 moves valve 19 from seat 20, permitting the entrance of air through openings 23.

Attention is called to the large area of the vacuum breaker diaphragm 16. Since gasket 13' is of a porous material, whenever a vacuum exists in the service line the entire diaphragm area is exposed to atmospheric pressure and is, therefore, effective in pulling seat 19 to open position. If seat 39 on spring loaded check 38 should be leaking slightly a small residual vacuum might occur in chamber 42 and might even extend over to chamber 61', if main valve C were leaking. However, the residual vacuum in chamber 61' is supplied by air which can enter at port 141 through passageway 140 and across seat 75. It is obvious that air can enter to supply this residual vacuum in chamber 61' at the same time that water leaking past check B is being discharged to atmosphere through port 96, and that there is no possibility for this incoming air to come into contact with polluted water, which might reversely flow from the domestic line.

It is to be understood that the vacuum breaker structure generally indicated at A as the primary vacuum breaker assembly may be employed independently in other installations.

It will be noted that all diaphragms have one side exposed to atmospheric pressure. Therefore, a rupture of any diaphragm will be immediately noticed because water will be discharged to the atmosphere. For example, if diaphragm 104 should break, water from chamber 132 would be discharged into annular space 143 and through opening 109 to the atmosphere. Therefore, constant leakage through openings 109 or 66 would indicate a ruptured diaphragm, and it can also be seen that a break of any diaphragm will not cause polluted water to come into contact with uncontaminated water.

It will thus be seen that the method of preventing backflow and back-siphonage in a flow line from a service main to a domestic piping system insures either a region of lower pressure or an air gap to atmosphere will be established when a superior fluid pressure occurs in the domestic piping system, and that any condition which would tend to create a vacuum in the line would be dissipated by breaking the vacuum, thereby insuring that under no conditions would it be possible for polluted water from the domestic piping system to flow into the service main.

While we have shown the preferred method and apparatus for practising our invention, it is to be understood that various changes might be made in the steps of the method and the details of construction of the apparatus by those skilled in the art, without departing from the spirit of the invention as claimed.

Having thus described our invention, what we claim and desire to secure by Letters Patent is:

1. A fluid valve to be interposed between a service line and a domestic line to prevent back siphonage and backflow and within both of which lines variable fluid pressure may prevail, which valve includes a housing, a service line connection thereto, a domestic line connection thereto, an intermediate passageway between said connections, a main valve at a point in said passageway between the service line and said passageway for interrupting flow of fluid therethrough, a barrier valve intermediate said main valve and the domestic line connection whereby the passageway may be divided into two chambers when said barrier valve is closed, separate air outlets from each of said chambers opened when said chambers are formed, fluid pressure responsive means acted upon by service line fluid pressure tending to open said main valve and said barrier valve, and fluid pressure responsive means acted upon by domestic line fluid pressure tending to close the main valve and to close the barrier valve.

2. A fluid valve to be interposed between a service line and a domestic line to prevent back siphonage and backflow and within both of which lines variable fluid pressure may prevail, which valve includes a housing, a service line connection thereto, a domestic line connection thereto, an intermediate passageway between said connections, a main valve at a point in said passageway for interrupting flow of fluid thereto, a barrier valve intermediate said main valve and the domestic line connection whereby the passageway may be divided into two chambers, separate air outlets from each of said chambers, separate valves tending to close the separate air outlets from the chambers of the passageway, fluid pressure responsive means acted upon by service line fluid pressure tending to open said main valve and said barrier valve, and fluid pressure responsive means acted upon by domestic line fluid pressure tending to close the main valve and to close the barrier valve, said service line actuated fluid pressure responsive means acting to close said air valves.

3. A fluid valve to be interposed between a service line and a domestic line to prevent back siphonage and backflow and within both of which lines variable fluid pressure may prevail, which valve includes a housing, a service line connection thereto, a domestic line connection thereto, an intermediate passageway between said connections, a main valve at a point in said passageway for interrupting flow of fluid thereto, a barrier valve intermediate said main valve and the domestic line connection whereby the passageway may be divided into two chambers, separate air outlets from each of said chambers, separate valves tending to close the separate air outlets from the chambers of the passageway, fluid pressure responsive means acted upon by service line fluid pressure tending to open said main valve and said barrier valve, fluid pressure responsive means acted upon by domestic line fluid pressure tending to close the main valve and to close the barrier valve, said service line actuated fluid pressure responsive means acting to close said air valves, and means cooperating with the domestic line fluid pressure in its action to close the main valve, whereby said valve will be positively closed when the ratio of domestic line pressure to the service line pressure exceeds a predetermined amount.

4. A fluid valve to be interposed between a service line and a domestic line to prevent back siphonage and backflow and within both of which lines variable fluid pressures may prevail, which valve includes a central flow passageway, a service line fluid connection to one end thereof, a domestic line fluid connection adjacent the opposite end thereof, a main valve at said service line end of the passageway and by which flow of fluid through the passageway may be interrupted, a barrier valve disposed within the passageway between the main valve and the domestic line connection, whereby the passageway will be divided into a primary and a secondary chamber when the barrier valve is closed, an outlet from the primary chamber to the atmosphere, an outlet from the secondary chamber to the atmosphere, separate valves for closing each of said outlets, fluid pressure responsive means acted upon by the pressure of service line fluid tending to open said main valve and the barrier valve and to close the air vent valves, and fluid pressure responsive means acted upon by the pressure of the fluid in the domestic line in opposition to said service line pressure and tending to close the main valve and the barrier valve and to open the air vent valves, said fluid pressure responsive means being of differential action whereby said main valve and barrier valve will be positively closed when the ratio of domestic line pressure to the service line exceeds a predetermined amount.

5. A fluid valve to be interposed between a service line and a domestic line to prevent back siphonage and backflow and within both of which lines variable fluid pressures may prevail, which valve includes a housing, a service line connection at one side thereof and a domestic line connection at the opposite side thereof, said connections each including passageways in substantially the same plane, an intermediate passageway in the housing lying in a plane normal to the service line and domestic line passageways, a conduit establishing communication between the service line passageway and one end of the intermediate passageway, a main valve disposed at said end of the intermediate passageway and adapted to close the same and when opened permitting fluid to flow through said intermediate passageway and through a port in the side wall thereof to the domestic line passageway, a barrier valve disposed within the intermediate passageway at a point between the main valve and said port, whereby the intermediate passageway may be divided into a primary passageway adjacent to the main valve and a secondary passageway communicating with the port leading to the domestic line, a vent valve in the secondary passageway communicating with atmosphere, an operative connection between the barrier valve and the vent valve whereby said valves will move simultaneously and will alternately close, fluid responsive means associated with the main valve and acted upon oppositely by the pressure of fluid in the service line and the domestic line, fluid pressure responsive means operatively associated with the barrier valve and the vent valve and acted upon oppositely by the pressure of fluid in the service line and the domestic line whereby the main valve and the barrier valve will close when the ratio of domestic line pressure to the service line pressure exceeds a predetermined amount and whereby the vent valve will open as the barrier valve closes and means acting to cause the main valve to close in advance of the closing of the barrier valve and the simultaneous opening of the vent valve.

6. The structure of claim 5 including a vent valve within the primary chamber establishing communication with atmosphere when opened separately from that of the vent valve in the secondary chamber, said valve acting to open when the barrier valve is closed.

7. A fluid valve structure to be interposed between a service line and a domestic line to prevent back siphonage and backflow and in both of which lines variable fluid pressure may prevail, which valve structure includes a housing, a service line connection thereto, a domestic line connection thereto, said housing providing an intermediate fluid passageway between said connections, a main valve for regulating and interrupting flow of fluid through said passageway, fluid pressure responsive means acted upon by the service line fluid pressure tending to open the main valve, fluid pressure responsive means acted upon by the domestic line fluid pressure tending to close said main valve, the main valve tending to maintain the domestic line pressure at a pressure less than the service line pressure at all times of normal flow and shut-off, a relief valve in the passageway on the discharge side of the main valve and opening to atmosphere, and fluid pressure responsive means acted upon by the opposed service line pressure and the domestic line pressure, whereby the service line pressure tends to urge said relief valve to a closed position and the domestic line pressure tends to urge said relief valve to an open position, said relief valve opening after the main valve closes and when the ratio of domestic line pressure to service line pressure exceeds a predetermined amount, and a barrier valve operating in unison with the relief valve the barrier valve moving to a closed position when the relief valve moves toward an open position, and the barrier valve moving to an open position when the relief valve moves to a closed position.

8. A fluid valve structure to be interposed between a service line and a domestic line to prevent back siphonage and backflow and in both of which lines variable fluid pressure may prevail, which valve structure includes a housing, a service line connection thereto, a domestic line connection thereto, said housing providing an intermediate fluid passageway between said connections, a main valve for regulating and interrupting flow of fluid through said passageway, fluid pressure responsive means acted upon by the service line fluid pressure tending to open the main valve, fluid pressure responsive means acted upon by the domestic line fluid pressure tending to close said main valve, the main valve tending to maintain the domestic line pressure at a pressure less than the service line pressure at all times of normal flow and shut-off, a relief valve in the passageway on the discharge side of the main valve and opening to atmosphere, and fluid pressure responsive means acted upon by the opposed service line pressure and the domestic line pressure, whereby the service line pressure tends to urge said relief valve to a closed position and the domestic line pressure tends to urge said relief valve to an open position, said relief valve opening after the main valve closes and when the ratio of domestic line pressure to service line pressure exceeds a predetermined amount, and a barrier valve operating in unison with the relief valve the barrier valve moving to a closed position when the relief valve moves toward an open position, and the barrier valve moving to an open position when the relief valve moves to a closed position, whereby a primary chamber is formed of the passageway between the main valve and the barrier valve and a secondary chamber is formed of the passageway, the said relief valve associated with the barrier valve acting to open and close the secondary chamber to atmosphere and a relief valve in the primary chamber acting to open said chamber to atmosphere, said last mentioned valve opening when the barrier valve is closed.

FRANK CARLTON.
LEONARD L. SNYDER.

(References on following page)

REFERENCES CITED

The following references are of record in the file of this patent:

UNITED STATES PATENTS

| Number | Name | Date |
|---|---|---|
| 1,173,518 | Hoxsie | Feb. 29, 1916 |
| 1,755,993 | Kelley | Apr. 22, 1930 |
| 1,960,144 | Entriken | May 22, 1934 |
| 2,117,389 | Yoder | May 17, 1938 |
| 2,146,204 | Dore | Feb. 7, 1939 |
| 2,159,056 | Sloan | May 23, 1939 |
| 2,292,871 | Dunn | Aug. 11, 1942 |
| 2,310,586 | Lohman | Feb. 9, 1943 |
| 2,328,007 | Griswold | Aug. 31, 1943 |
| 2,328,118 | Ahlport | Aug. 31, 1943 |
| 2,389,412 | Carlton | Nov. 20, 1945 |
| 2,389,413 | Carlton | Nov. 20, 1945 |

FOREIGN PATENTS

| Number | Country | Date |
|---|---|---|
| 32,593 | Austria | of 1908 |
| 322,993 | Great Britain | of 1929 |